(12) United States Patent
Sponheimer et al.

(10) Patent No.: US 11,171,343 B2
(45) Date of Patent: Nov. 9, 2021

(54) FUEL CELL STACK AND METHOD FOR OPERATING A FUEL CELL STACK

(71) Applicant: FORD GLOBAL TECHNOLOGIES, LLC, Dearborn, MI (US)

(72) Inventors: Arnulf Sponheimer, Kornwestheim (DE); Stephan Strahl, Bodenwoehr (DE); Julio Orozco Santos Coy, Aachen (DE); Rolf Lorenz Loeffler, Rommerskirchen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 236 days.

(21) Appl. No.: 16/575,522

(22) Filed: Sep. 19, 2019

(65) Prior Publication Data
US 2020/0091537 A1   Mar. 19, 2020

(30) Foreign Application Priority Data

Sep. 19, 2018  (DE) ................... 10 2018 215 892.4

(51) Int. Cl.
| | | |
|---|---|---|
| *H01M 8/04* | (2016.01) | |
| *H01M 8/04119* | (2016.01) | |
| *H01M 8/04223* | (2016.01) | |
| *H01M 8/0662* | (2016.01) | |
| *H01M 8/04828* | (2016.01) | |
| *H01M 8/24* | (2016.01) | |
| *H01M 8/04291* | (2016.01) | |

(52) U.S. Cl.
CPC ... *H01M 8/04156* (2013.01); *H01M 8/04253* (2013.01); *H01M 8/04291* (2013.01); *H01M 8/04843* (2013.01); *H01M 8/0662* (2013.01); *H01M 8/24* (2013.01)

(58) Field of Classification Search
CPC ......... H01M 8/04156; H01M 8/04253; H01M 8/04291; H01M 8/04843; H01M 8/0662; H01M 8/24
USPC ....................................................... 429/421
See application file for complete search history.

(56) References Cited

U.S. PATENT DOCUMENTS

2005/0129991 A1* 6/2005 Breault ............. H01M 8/04225
429/436

FOREIGN PATENT DOCUMENTS

| DE | 102004053938 A1 | 5/2006 |
| GB | 2469522 A | 10/2010 |
| JP | 2004178950 A | 6/2004 |
| JP | 2011165516 A * | 8/2011 |
| JP | 2011165516 A | 8/2011 |
| KR | 20120026876 A | 3/2012 |

(Continued)

OTHER PUBLICATIONS

DE Examination Report DE 10 2018 215 892.4 Filed Jul. 15, 2019, 7 pages.

*Primary Examiner* — James M Erwin
(74) *Attorney, Agent, or Firm* — Brooks Kushman PC; David Kelley

(57) ABSTRACT

A fuel cell stack includes multiple stacked individual cells each having an anode and a cathode, a common fuel inlet duct, a common fuel outlet duct, a common oxidizing agent inlet duct, a common oxidizing agent outlet duct, and at least one microwave source configured to selectively generate microwave radiation into the common fuel outlet duct and/or into the common oxidizing agent outlet duct to manage water contained therein to melt ice and/or expedite evaporation.

20 Claims, 11 Drawing Sheets

(56) References Cited

FOREIGN PATENT DOCUMENTS

WO      2005114690 A2    12/2005
WO      2015049533 A1    4/2015

\* cited by examiner

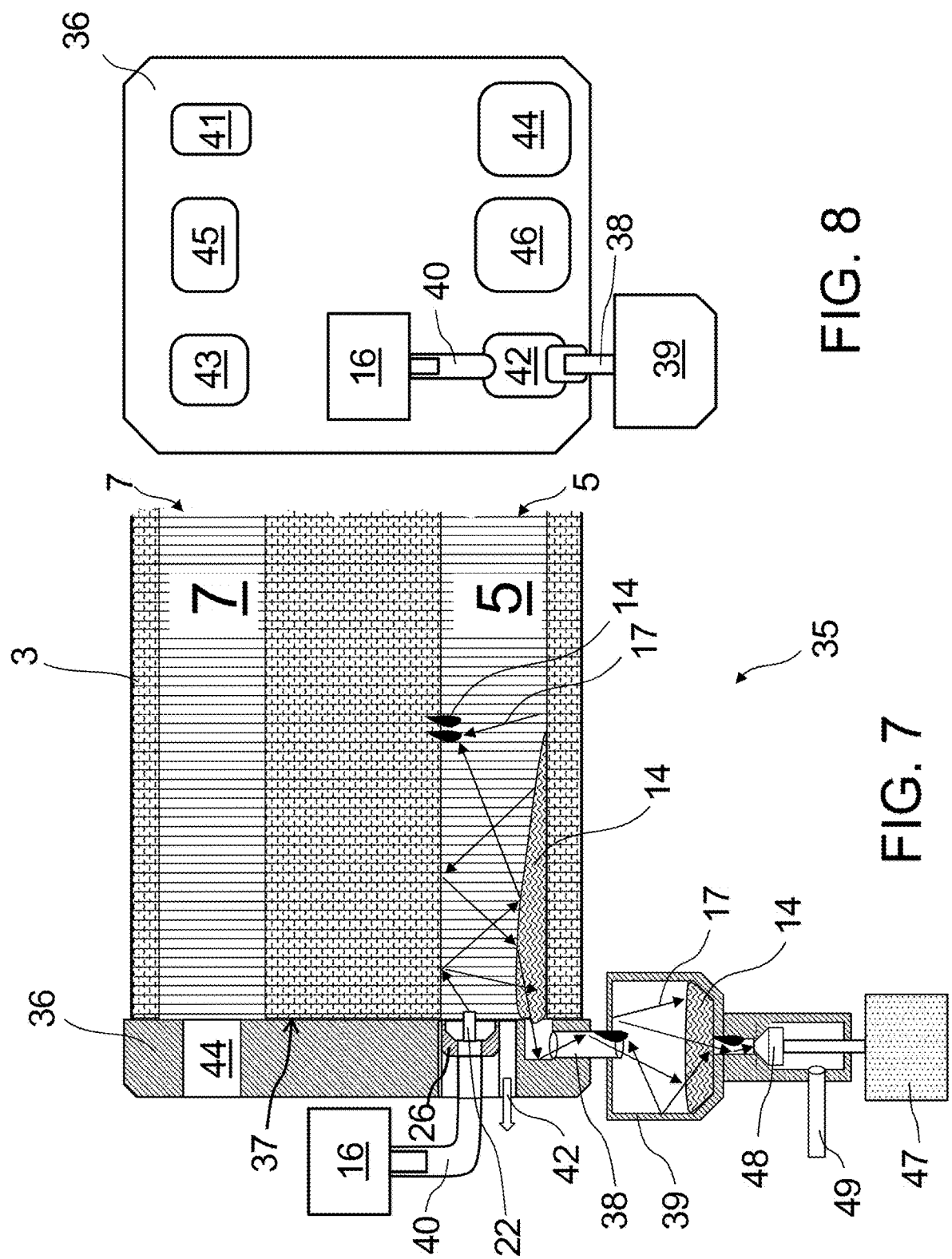

FUEL CELL STACK AND METHOD FOR OPERATING A FUEL CELL STACK

CROSS-REFERENCE TO RELATED APPLICATIONS

This application claims foreign priority benefits under 35 U.S.C. § 119(a)-(d) to DE Application 10 2018 215 892.4 filed Sep. 19, 2018, which is hereby incorporated by reference in its entirety.

TECHNICAL FIELD

This disclosure relates to a fuel cell stack with multiple individual cells having an associated source of microwave radiation for management of water in fuel and air supply channels.

BACKGROUND

Fuel cells, for example proton-exchange membrane fuel cells (PEMFC) convert reactants, namely a fuel (such as hydrogen) and an oxidizing agent (such as oxygen, for example atmospheric oxygen) to generate electrical energy for an electrical consumer. PEMFCs generally use a proton-permeable polymer electrolyte membrane between two electrodes, namely a cathode and an anode. An arrangement, which comprises a proton-permeable polymer membrane that is arranged between the two electrodes, is also referred to as a membrane electrode arrangement (MEA). Flow field plates are provided in a typical fuel cell on each side of an MEA. The flow field plates include distribution ducts for the reactants to distribute the fuel and the oxidizing agent to the respective electrodes and remove by-products of the electrochemical reactions that occur within the fuel cell. Water is the main by-product in a cell that is operated by hydrogen and air as reactants. Since the voltage output by an individual cell is low (in the magnitude of 1 V) a plurality of cells is usually stacked together in series for commercial applications. Furthermore, fuel cell stacks may be connected in series and/or in parallel in groups of mutually connected stacks for use in automotive applications and the like.

It is possible in specific applications for PEMFC stacks to be subjected to repeated cycles of an ON-OFF operation which include being stored over different periods of time and at different temperatures. It is generally desirable to be able to start-up such stacks reliably and in a short time. Specific applications, by way of example automotive applications, may require a comparatively rapid and reliable start-up procedure starting from storage conditions that are considerably below freezing. This represents a significant challenge due to relatively low power capacity with respect to the conversion rates of the cells as well as water management in the cells. A certain quantity of water may be needed for the proper operation of the fuel cell (by way of example for moistening the electrolyte membrane). Consequently, water is generated on the one hand as a result of providing electrical energy (product water) and on the other hand may pass into and collect in the fuel cell on account of water vapor that is contained in the air (oxidizing agent). If liquid water is present in the cell when corresponding temperatures are near or below freezing, ice often develops. The presence of ice in the cell, for example in the ducts of the anode-side and cathode-side flow field plates, may be problematic depending upon how much water is present during the storage procedure and during the start-up procedure.

Frozen water droplets may block ducts in the anode-side and/or in the cathode-side flow field plates, which may result in partial or complete obstruction of the fluid flow at the anode or cathode and thus reduces the active reaction surface and leads to a reduced power capacity of the fuel cell. If electrical power continues to be drawn from the fuel cell by a connected electrical consumer, the cell voltage breaks down and may even achieve negative values (associated with electrolysis setting in), which may result in the catalyst being damaged or destroyed. As a result, the fuel cell or entire stack may be damaged and require replacement.

SUMMARY

Embodiments according to the disclosure include a fuel cell stack and method for operating a fuel cell stack that provide desired power and long-life operation of the stack under all anticipated operating conditions, in particular when being used in a motor vehicle. In this case, the fuel cell stack and method of operation provide a rapid start-up or commissioning time even under operating conditions near or below the freezing point of water. In addition, various embodiments of a fuel cell stack according to the disclosure may be produced as a simple construction in a cost-effective manner.

It is to be noted that the features disclosed individually may be combined with one another in any technically expedient manner and demonstrate further embodiments of the claimed subject matter that may not be explicitly described or illustrated.

It is moreover to be noted that a conjunction "and/or" that is used herein below, standing between two features and linking features to one another is to be understood such that in a first embodiment only the first feature may be present, in a second embodiment only the second feature may be present, and in a third embodiment both the first and also the second feature may be present.

In one or more embodiments, a fuel cell stack comprises multiple stacked individual cells having respectively an anode and a cathode, a common fuel inlet duct and a common fuel outlet duct and also a common oxidizing agent inlet duct and a common oxidizing outlet duct. The term "common" inlet duct and "common" outlet duct is to be understood to mean an individual duct that is available to at least one part of multiple stacked individual cells, this stacked part of the individual cells being connected to said individual duct commonly in a fluid-conducting connection. Accordingly, fuel, for example hydrogen, may be supplied to the anodes of the plurality of individual cells respectively from the common fuel inlet duct, for example via a flow field plate that is formed by an anode-side flow field plate, and said fuel may be discharged from the individual cells into the common fuel outlet duct. Furthermore, it is possible in accordance with one or more embodiments to also supply the cathodes of the individual cells respectively with oxidizing agent, for example oxygen or rather atmospheric oxygen, from the common oxidizing agent inlet duct, for example via a flow field that is formed by a cathode-side flow field plate, and to discharge oxidizing agent from the individual cells into the common oxidizing agent outlet duct. Various embodiments provide at least one microwave source, for example in the form of a magnetron, for selectively generating microwave radiation, wherein the microwave source is arranged and configured to direct the generated microwave radiation into the common fuel outlet duct and/or into the common oxidizing agent outlet duct in such a manner that frozen water that is present there is melted and/or liquid water is evaporated.

The fundamental construction of a fuel cell is generally known for example of a proton-exchange membrane fuel cell (PEMFC) that comprises flow field plates comprising distribution ducts (said flow field plates also referred to as common bipolar plates of adjacent individual cells within the stack) for supplying and distributing the reactants to the anode (fuel) or rather the cathode (oxidizing agent), a proton-permeable polymer electrolyte membrane, which is inserted between the anode and the cathode and includes a catalyst, an electrical connection of an electrical consumer to the fuel cell stack for drawing off electrical energy or rather power from said fuel cell stack and the like, with the result it is not necessary to provide herein a comprehensive, detailed explanation of the fuel cell.

It has been established that under specific circumstances during the start-up procedure of a fuel cell below the freezing point of water it is possible at temperatures close to the thaw point or melt point of water for ice to form on the anode and/or on the cathode of adjoining flow field plates, in particular of PEMFCs. In this case, it is possible for ice to form in particular in the proximity of the transitions from the anode-side and/or from the cathode-side flow field plates into the common fuel outlet duct or rather into the common oxidizing agent outlet duct. The microwave radiation in accordance with various embodiments is directed into the fuel outlet duct and/or into the oxidizing agent outlet duct to consequently inter alia at least melt frozen water that is present precisely in these transition regions. As a result, in the case of a start-up procedure under freezing conditions, in particular in the case of a start-up procedure in a temperature range between by way of example −5° C. and approx. +5° C. or also in a temperature range considerably below 0° C., any impairment or interruption of the fuel flow and/or of the oxidizing agent flow along the anodes or cathodes of the individual fuel cells is reliably avoided. Consequently, the fuel cell stack essentially achieves its full electrical power capacity immediately after the start-up procedure under freezing conditions. Likewise, a voltage reversal in one individual cell and the associated destruction of the catalyst is reliably prevented.

Embodiments according to the disclosure may provide various advantages. For example, incorporation of a microwave source as described herein facilitates use of less-expensive catalysts that do not need to be selected to prevent a potential cell voltage reversal. This also allows configuration of the flow ducts of the flow field plates in a simpler manner since it is no longer possible for blocked flow ducts to have a negative influence on a uniform and large-area inflow into the anode or cathode lying against the respective flow field plate. Overall, this also results in the reduction of the production costs for a fuel cell stack.

Moreover, heating the frozen and/or liquid water molecules that are Hertzian dipoles by means of microwave radiation that is generated by means of the microwave source has proven to be particularly effective and requires a small outlay of energy to eliminate the frozen water as compared to the energy required to thermally heat the entire fuel cell stack by means of a correspondingly suitable heating device.

In various embodiments, the individual cells that form the fuel cell stack are proton-exchange membrane fuel cells (PEMFC) with the fuel being hydrogen and the oxidizing agent being oxygen that may be drawn off from atmospheric air. Other embodiments may use different fuel and/or oxidizing agents and/or obtain the oxidizing agent in another manner.

Embodiments may be configured such that the microwave radiation is directed at least into the fuel outlet duct since it has been surprisingly established that said duct is particularly critical with respect to ice forming in the water present in said duct. Although product water also occurs at the cathode as a result of the chemical reduction occurring at said cathode, the fuel (for example hydrogen) is however in particular also moistened in a generally known manner preferably up to 100% relative moisture for moistening the membrane so as to achieve a maximum (optimal) fuel cell power capacity.

Embodiments may include microwave radiation that is directed to areas or components other than the fuel outlet duct. Embodiments may include providing microwave radiation into the oxidizing agent outlet duct and/or into both the fuel outlet duct and the oxidizing agent outlet duct.

In accordance with one advantageous embodiment, multiple fuel outlet bore holes are provided in the common fuel outlet duct via which the fuel may be discharged from the anodes of the individual cells into the common fuel outlet duct, and/or multiple oxidizing agent outlet bore holes are provided in the common oxidizing agent outlet duct via which the oxidizing agent may be discharged from the cathodes of the individual cells into the common oxidizing agent outlet duct, wherein the microwave radiation is radiated into the common fuel outlet duct and/or into the common oxidizing agent outlet duct in such a manner that said microwave radiation arrives at or meets the fuel outlet bore holes and/or the oxidizing agent outlet bore holes.

Since it has been established that ice forms in particular at the fuel outlet bore holes and/or at the oxidizing agent outlet bore holes into the respective outlet ducts as a result of a relatively high capillary effect of said bore holes, generally outlet bore holes that are configured with a comparatively small diameter, the microwave irradiation of these outlet bore holes has proven to be particularly effective. It has further been established that the microwave radiation in this case also penetrates up to a specific extent into the respective outlet bore holes with the result that frozen water is at least liquefied effectively even within the outlet bore holes.

According to a further advantageous embodiment of the invention, a waveguide is provided via which microwave radiation from the microwave source is directed into the common fuel outlet duct and/or into the common oxidizing agent outlet duct. As a result, the microwave radiation may be used even more effectively for heating, in other words for liquefying and/or evaporating, the water that is present in the respective outlet ducts.

One even further advantageous embodiment provides that the waveguide is configured in a tube-shaped manner and extends at least into part of the fuel outlet duct and/or into part of the oxidizing agent outlet duct. In this case, the waveguide extends preferably at least up to half of the longitudinal extension of the respective outlet duct or also to a greater extent, for example at least approximately up to ¾ or approximately ⅘ into the fuel outlet duct and/or into the oxidizing agent outlet duct. A peripheral wall (tube wall) of the waveguide comprises at least one opening through which a site-specifically concentrated radiation of the microwave radiation is effected into the fuel outlet duct and/or into the oxidizing agent outlet duct. Such an embodiment of the waveguide has proven itself to be particularly advantageous by way of example in combination with the fuel outlet bore holes in the fuel outlet duct or rather with the oxidizing agent outlet bore holes in the oxidizing agent outlet duct, said fuel outlet bore holes being purposefully irradiated by means of said microwave radiation. The cross section of the tubular waveguide may be configured in an angular manner, for example polygonal, rectangular, square etc., round, for example circular, elliptical etc. and the like.

In accordance with a further advantageous embodiment, the at least one microwave source is attached and retained on one of the multiple stacked individual cells on an end plate that closes off a free stack end.

In addition to a receiving bore hole and/or to a retaining arrangement for the microwave source, the end plate may not comprise any further openings leading to the free stack end of the fuel cell stack. Consequently, the end plate may completely close off (gas tight) the fuel cell stack at one end.

According to an even further advantageous embodiment, the end plate may comprise a water drain bore hole, which is allocated to the fuel outlet duct and comprises a water collection vessel that is connected thereto in a fluid-conducting manner, wherein the microwave radiation is radiated into the fuel outlet duct in such a manner that said radiation arrives at or meets the water drain bore hole and/or the water collection vessel. The water drain bore hole is used to drain the water, in other words to remove (also referred to as "purging") water that has collected in the fuel outlet duct into the water collection vessel from where in predetermined time intervals it is able to be discharged via a corresponding drainage valve arrangement. The irradiation of the water drain bore hole by means of the microwave radiation also effectively prevents said water drain bore hole becoming blocked by means of frozen water. Likewise, it is possible for frozen water in the water collection vessel to be thawed rapidly for example after a start-up procedure under freezing conditions and accordingly for said water to be discharged correspondingly swiftly.

The end plate may furthermore comprise a fuel inlet opening that is allocated to the fuel inlet duct, a fuel outlet opening that is allocated to the fuel outlet duct, an oxidizing agent inlet opening that is allocated to the oxidizing agent inlet duct and also an oxidizing agent outlet opening that is allocated to the oxidizing agent outlet duct. However, this is not absolutely necessary. An end plate that comprises the aforementioned openings may also be described as an (end face) flow field plate or media distribution plate (MDP). In this case, the openings are provided respectively so as to deliver or rather supply the respective reactants to the corresponding ducts.

In accordance with a further advantageous embodiment, a first microwave source is provided for generating and radiating microwave radiation into the common fuel outlet duct and a second microwave source is provided for generating and radiating microwave radiation into the common oxidizing agent outlet duct.

According to an even further alternative embodiment, only one single microwave source is provided for generating and radiating microwave radiation both into the common fuel outlet duct and also into the common oxidizing agent outlet duct. In this case, the microwave radiation that is generated by the single microwave source is supplied to the respective outlet ducts via a branched microwave antenna and/or via a branched supply waveguide.

In accordance with a further aspect of the disclosure, a method is provided for operating a fuel cell stack, wherein the fuel cell stack comprises multiple stacked individual cells having respectively an anode and a cathode, a common fuel inlet duct and a common fuel outlet duct and also a common oxidizing agent inlet duct and a common oxidizing agent outlet duct. Fuel is supplied to the anodes of the individual cells respectively from the common fuel inlet duct and said fuel is discharged from the individual cells into the common fuel outlet duct. Oxidizing agent is supplied to the cathodes of the individual cells respectively from the common oxidizing agent inlet duct and discharged from the individual cells into the common oxidizing agent outlet duct. Furthermore, microwave radiation is selectively generated by means of at least one microwave source and said microwave radiation is radiated into the common fuel outlet duct and/or into the common oxidizing agent outlet duct in such a manner that frozen water that is present there is melted and/or liquid water is evaporated.

With regard to method-related definitions of terms and also the effects and advantages of method-related features, reference is made to the above explanations of corresponding definitions, effects and advantages with regard to the device. Disclosures herein with regard to the device are also to be able to be used in a corresponding manner for the definition of the method in accordance with the disclosure insofar as this is not explicitly excluded. Likewise, disclosures herein with regard to the method may be used in a corresponding manner for the definition of the device insofar as this is likewise not explicitly excluded herein. In this respect, to a great extent a repetition of explanations of correspondingly identical features, their effects and advantages with respect to the device and the method disclosed herein is omitted herein in favor of a compact description.

With regard to a method according to the disclosure, it is to be mentioned that in accordance with one particular advantageous embodiment, the microwave radiation is generated during a start-up procedure of the fuel cell stack under freezing conditions. In particular in the case of a start-up procedure under freezing conditions, the microwave radiation that is radiated into the oxidizing agent outlet duct may likewise reliably prevent water vapor that is present in the oxidizing agent, for example in cold, moist air, from freezing.

An even further advantageous embodiment provides that the microwave radiation is generated during a procedure of flushing fuel out of the anodes and/or during a procedure of flushing oxidizing agent out of the cathodes. It is generally known to perform a flushing procedure of this type in specific time intervals since water that has collected or rather settled on the anode or cathode reduces the active reaction surface and consequently leads to a reduced power capacity of the stack. In this case, the microwave radiation is able to melt any ice that is present and/or also evaporate liquid water in order to significantly accelerate the flushing procedure and thus reduce the flushing times.

In accordance with a further advantageous embodiment, the microwave radiation is generated during a warm running operation and/or during a normal operation of the fuel cell stack to control the moistening of the fuel cell stack or rather of the membrane in particular by means of evaporating the water. As already mentioned, the electrical power output of the fuel cell stack is fundamentally dependent upon the membrane being sufficiently moistened. It is possible, in particular during a warm running phase in which the reactants or rather reaction fluids (for example hydrogen and oxygen) do not yet comprise their desired relative moisture, for the additional evaporation of water that is present in the fuel outlet duct and/or in the oxidizing agent outlet duct to ensure an effective, rapid moistening of the reactants and consequently to ensure an optimal water content of the fuel cell stack with respect to the power output. Thus, it is possible by way of example to supply the moistened fuel that is discharging in the fuel outlet duct back to the fuel inlet duct and thus ensure a rapid moistening of the anodes of the stack.

In accordance with a still further advantageous embodiment, the microwave radiation is generated during a switch-off procedure of the fuel cell stack to evaporate water in the fuel cell stack. In this manner, it is possible to almost completely remove water from the fuel outlet duct and/or from the oxidizing agent outlet duct as the stack is being switched off, with the result that during a subsequent storage procedure of the fuel cell stack below the freezing point of water hardly any or only a considerably reduced amount of ice is formed within the fuel cells. This in turn considerably improves the efficacy of the subsequent start-up procedure under freezing conditions. It goes without saying that the water that is evaporated in the respective outlet ducts is discharged from the stack into the environment during a switch-off procedure of the stack.

The output power of the microwave radiation that is generated by the microwave source may be advantageously controlled merely by switching the microwave source on and off in accordance with a predetermined duty cycle, similar to a pulse width modulation (PWM) control procedure. This represents an embodiment of the microwave power control procedure that is particularly simple to realize. It is possible via the microwave power to control the extent and the speed of the water warming procedure with the result that it is possible to thaw and/or to evaporate the irradiated water.

The power output of the microwave radiation that is generated by the microwave source may alternatively also be controlled continuously by influencing a hot cathode of the microwave source, for example a magnetron, with an electrical heating DC voltage of a predeterminable magnitude and/or by influencing an anode of the microwave source with an anode AC voltage of a predeterminable magnitude and/or with a frequency.

Further features and advantages arise from the following description of representative embodiments with reference to the drawings, wherein the representative embodiments are merely illustrative of the claimed subject matter and are not to be understood as limiting.

BRIEF DESCRIPTION OF THE DRAWINGS

FIG. 7 a longitudinal sectional view of a still further representative embodiment of a fuel cell stack taken along the section plane A-A illustrated FIG. 1.

FIG. 8 a plan view of an end plate of the fuel cell stack shown in FIG. 7.

DETAILED DESCRIPTION

Figure 1:
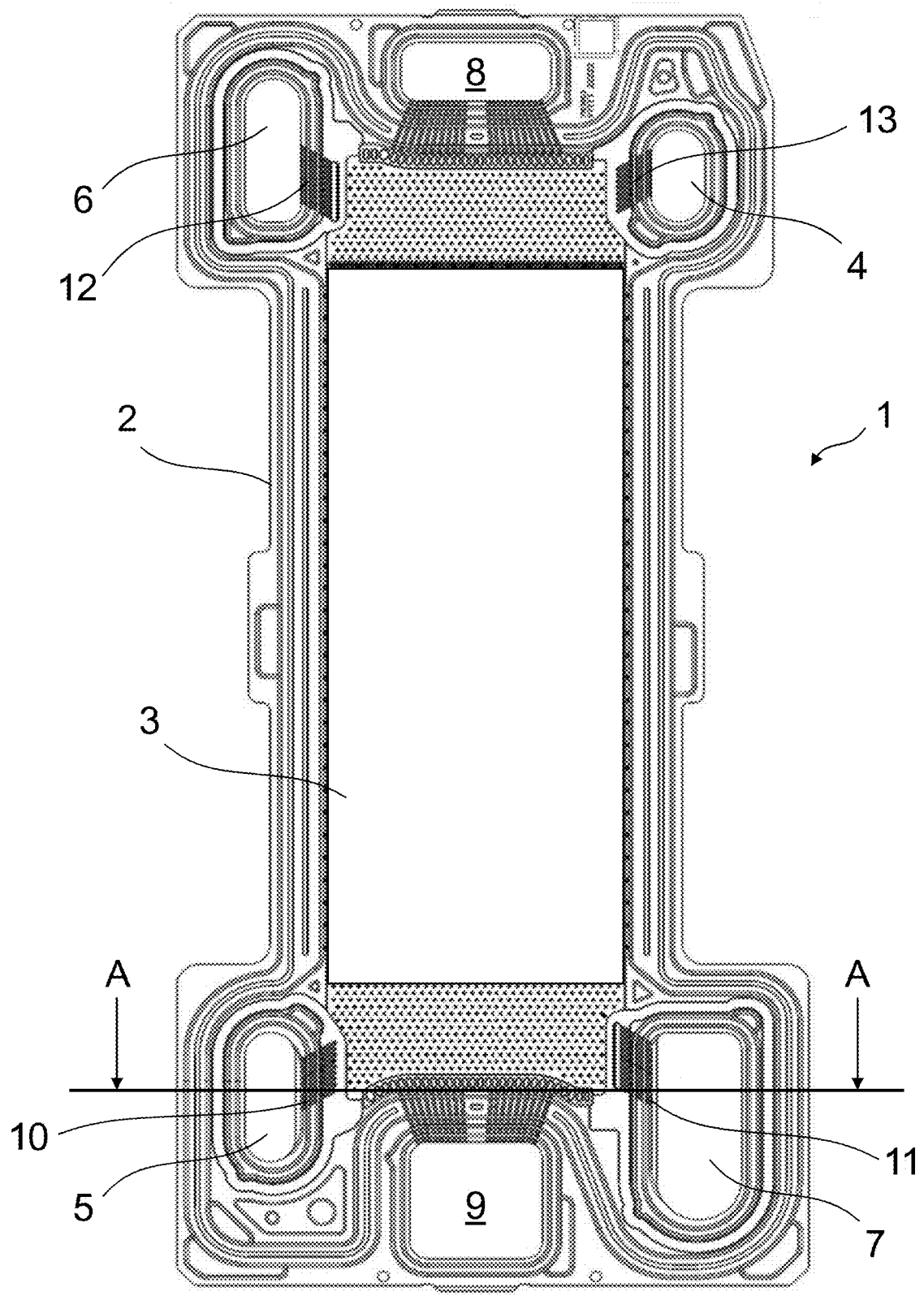
FIG. 1 is a plan view of a free stack end of a representative embodiment of a fuel cell stack having a microwave source.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Parts that are equivalent with respect to their function are provided with the same reference numerals in the different figures with the result that said parts are generally also only described once.

FIG. 1 illustrates a plan view of a free end of a representative embodiment of a fuel cell stack 1 in accordance with the disclosure. FIG. 1 illustrates in particular a free stack end 2 of the fuel cell stack 1. Multiple individual cells 3 that form the fuel cell stack 1 and are configured in the present case as PEMFC fuel cells are only illustrated symbolically in FIG. 1. It is adequately known to connect such individual cells 3 together to form the entire fuel cell stack 1 with the result that no further explanation of this is provided herein. Although it is not explicitly illustrated in FIG. 1, each individual cell 3 comprises inter alia an anode and a cathode and also a flow field that conveys the reactants to said anode and cathode. Furthermore, the fuel cell stack 1 comprises a common fuel inlet duct 4 and a common fuel outlet duct 5 and also a common oxidizing agent inlet duct 6 and a common oxidizing agent outlet duct 7. Moreover, it is apparent in FIG. 1 that the fuel cell stack 1 comprises a cooling medium inlet duct 8 and a cooling medium outlet duct 9.

The cooling medium inlet duct 8 and the cooling medium outlet duct 9 are used to convey a cooling medium in order to cool the fuel cell stack 1 during its operation in an adequately known manner as a result of the reaction heat that is generated within the individual cells during the chemical reaction of the reactants (fuel, oxidizing agent).

Furthermore, fuel, in the present case hydrogen, may be supplied to the anodes of the individual cells 3 respectively from the common fuel inlet duct 4 and said fuel may be discharged from the anodes into the common fuel outlet duct 5. Oxygen in the form of atmospheric oxygen may be supplied to the cathodes of the individual cells 3 respectively from the common oxidizing agent inlet duct 6 and said oxygen may be discharged from the cathodes into the common oxidizing agent outlet duct 7.

As is schematically illustrated in FIG. 1, multiple fuel outlet bore holes 10 are provided in the common fuel outlet duct 5 and it is possible via said bore holes to discharge fuel from the anodes of the individual cells 3 into the common fuel outlet duct 5. Moreover, multiple oxidizing agent outlet bore holes 11 are provided in the common oxidizing agent outlet duct 7 and it is possible via said bore holes to discharge the oxidizing agent from the cathodes of the individual cells 3 into the common oxidizing agent outlet duct 7.

Similar inlet bore holes 12 and 13 for the fuel (fuel inlet bore holes 12) or rather for the oxidizing agent (oxidizing agent inlet bore holes 13) may also be provided in the fuel inlet duct 4 or in the oxidizing agent inlet duct 6 respectively in order to supply the fuel from the fuel inlet duct 4 to the anodes of the individual cells 3 or rather to supply the oxidizing agent from the oxidizing agent inlet duct 6 to the cathodes of the individual cells 3.

Figure 2:
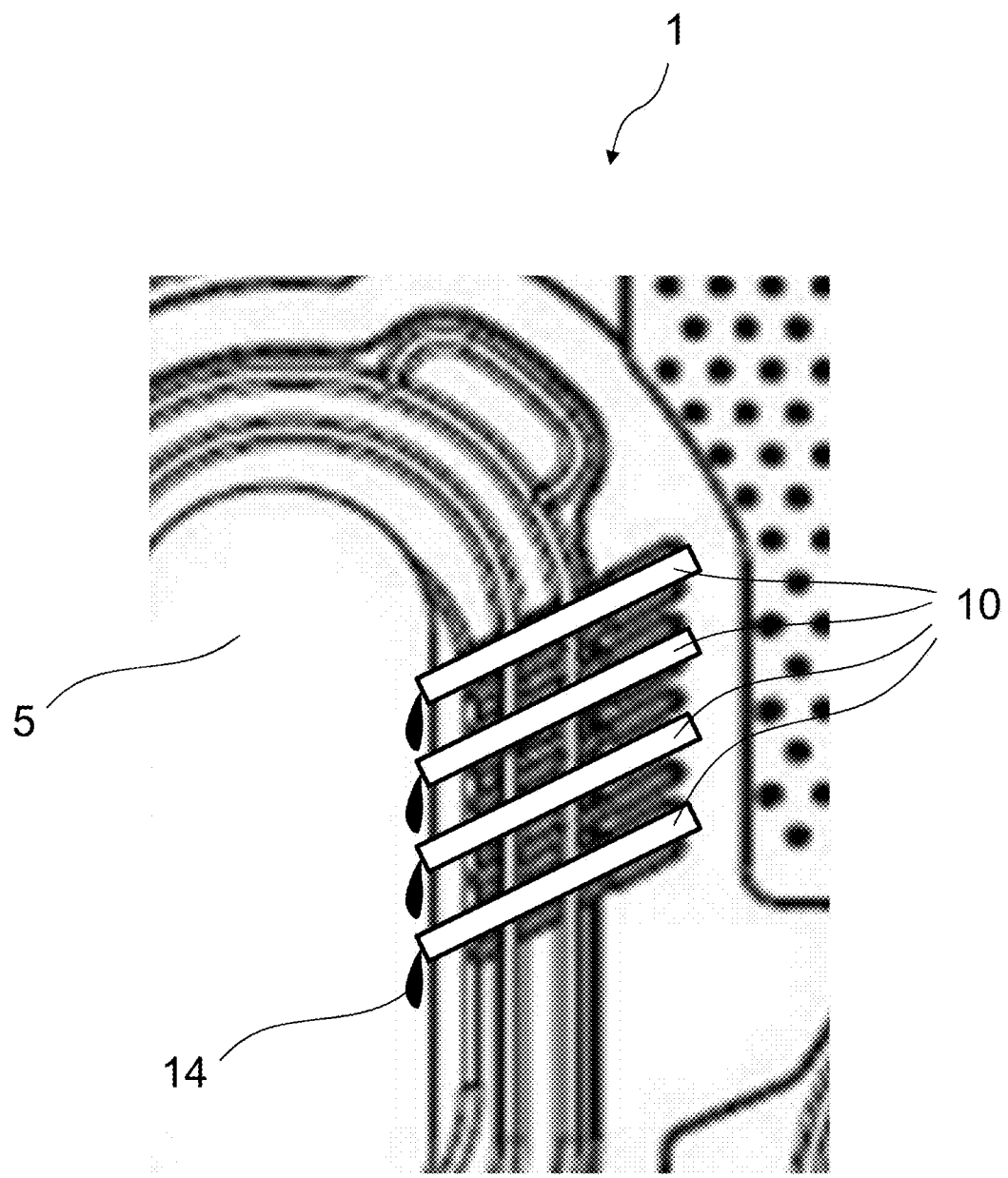
FIG. 2 is an enlarged partial view of the fuel cell stack shown FIG. 1.

FIG. 2 illustrates an enlarged partial view of the fuel cell stack 1 shown in FIG. 1. FIG. 2 illustrates in particular the region of the fuel outlet duct 5 that is illustrated in FIG. 1, in which the fuel outlet bore holes 10 are arranged. FIG. 2 illustrates some of these outlet bore holes 10 in an enlarged view. Furthermore, FIG. 2 illustrates water droplets 14 to clarify that water, for example product water or condensing water that is precipitating from the respective moistened reactants 14, may collect in particular at or in the fuel outlet bore holes 10 that comprise a relatively small diameter and as a consequence have a high capillary effect. In particular, the water droplets 14 may freeze at the fuel outlet bore holes 10 in the case of environmental temperatures of the fuel cell stack 1 below the freezing point of water and then collect as frozen water droplets 14 in or at the respective fuel outlet bore hole 10 that as a consequence is blocked or clogged.

It is to be understood that the explanations that are provided herein and that relate only to the fuel outlet bore holes 10 likewise apply in a corresponding manner for the oxidizing agent outlet bore holes 11 insofar as this is not explicitly excluded herein. The same likewise applies for the explanations with regard to only one of the two outlet ducts 5 (fuel) and 7 (oxidizing agent) for the respective other outlet duct insofar as this is not explicitly excluded herein.

Figure 3:
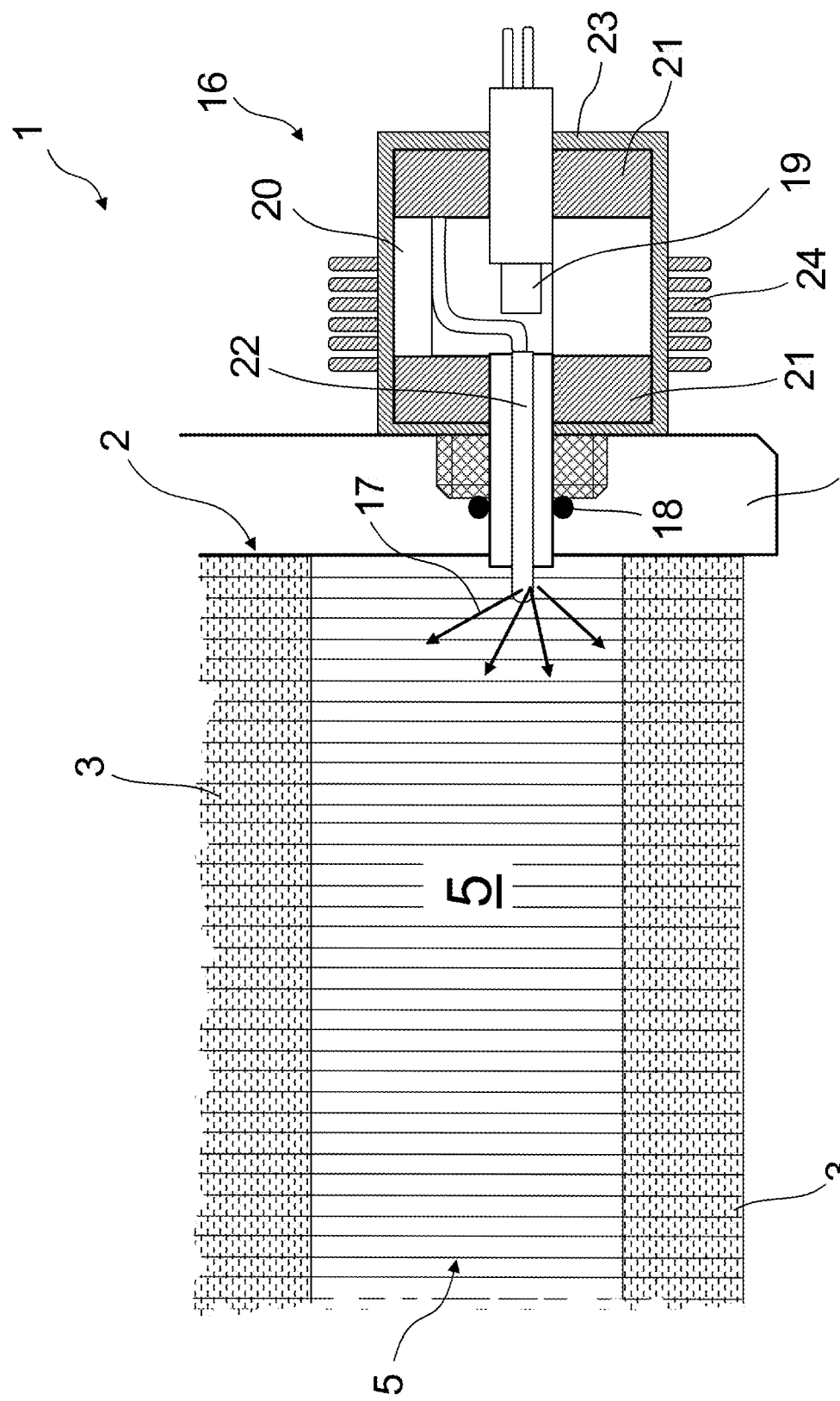
FIG. 3 is a longitudinal sectional view of the fuel cell stack shown in FIG. 1 along the section plane A-A illustrated in FIG. 1.

FIG. 3 illustrates schematically a longitudinal sectional view of the fuel cell stack 1 shown in FIG. 1 along the section plane A-A illustrated in FIG. 1. In the state of the fuel cell stack 1 illustrated in FIG. 3, the free stack end 2 is closed off in a gas-tight manner with an end plate 15. A microwave source 16 is attached to this end plate 15 and said microwave source is retained by the end plate 15. The microwave source 16 that in the present case is configured as a magnetron that is known per se generates a microwave radiation 17 selectively, in other words according to the activation and deactivation of the magnetron 16 that is brought about by a control unit (not illustrated). In the case of the illustrated embodiment of the fuel cell stack 1, the microwave radiation 17 that is generated by the microwave source 16 is radiated into the common fuel outlet duct 5. The fuel outlet duct 5 is shown in FIG. 3 as a non-shaded central region of the fuel cell stack 1.

As is further apparent in FIG. 3, apart from the receiving arrangement for the microwave source 16, the end plate 15 essentially does not comprise any further openings extending to the free stack end 2. The stack end 2 is completely closed off (fluid-tight) by means of the end plate 15. Accordingly, the microwave source 16 is also received into the end plate 15 in a gas-tight manner by means of a corresponding sealing ring 18.

The fundamental construction and operating principle of the microwave source 16 that is configured in the present case as a magnetron are adequately known with the result that a detailed description is not provided. It is apparent in FIG. 3 that the magnetron 16 comprises essentially a cathode 19, in particular a hot cathode, a hollow cylindrical anode 20 that is configured as a hollow space resonator, two annular magnets 21 that are spaced apart from one another in an axial manner and a microwave antenna 22 from which the generated microwave radiation 17 is radiated. Moreover, in order to improve the cooling of the magnetron 16, a housing 23 that receives said magnetron comprises multiple cooling ribs 24.

Figure 4:
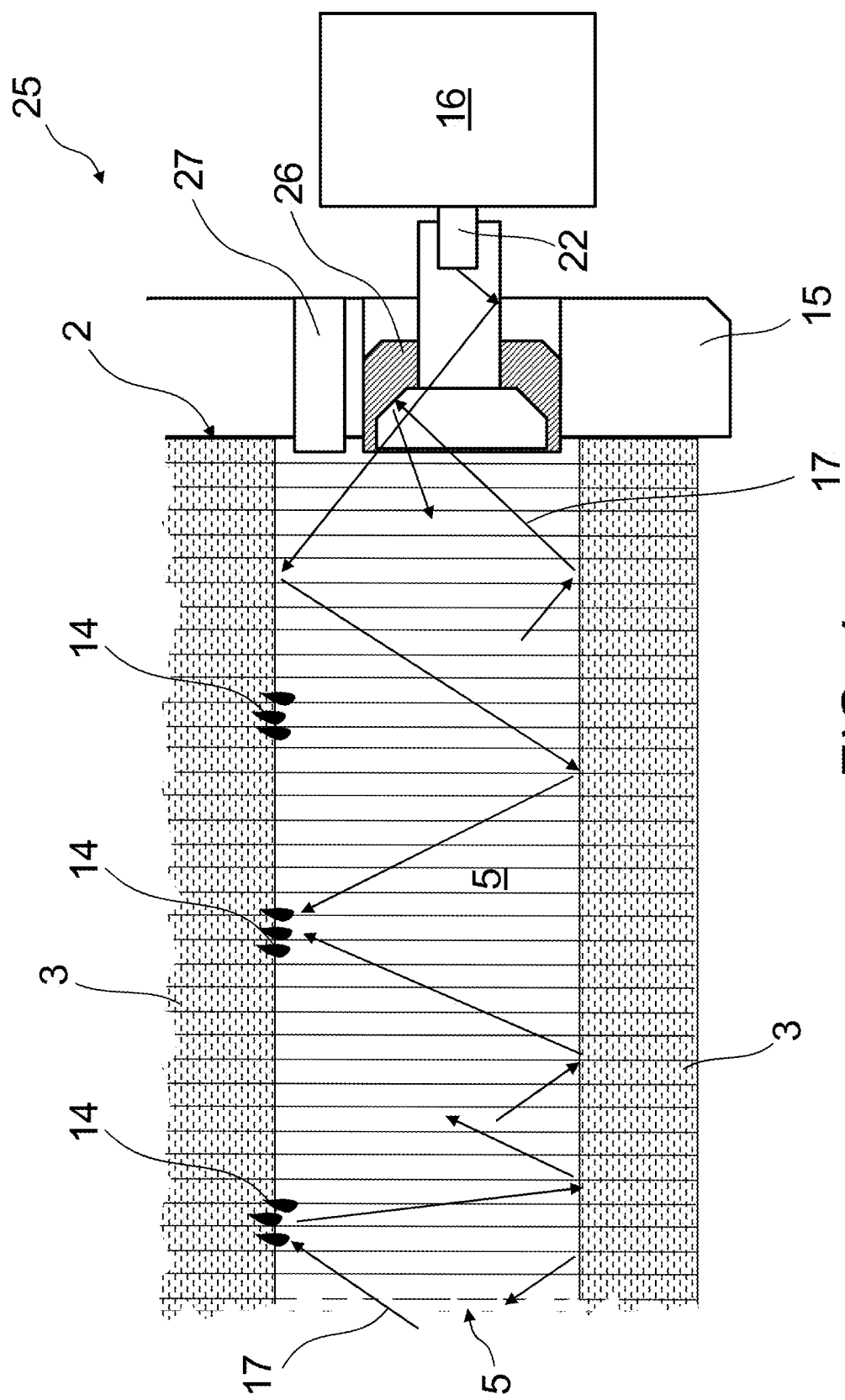
FIG. 4 is a longitudinal sectional view of a further representative embodiment of a fuel cell stack taken along the section plane A-A illustrated FIG. 1.

FIG. 4 illustrates schematically a longitudinal sectional view of a further exemplary embodiment of a fuel cell stack 25 along the section plane A-A illustrated in FIG. 1. In contrast to the fuel cell stack 1 shown in FIG. 3, the fuel cell stack 25 comprises a waveguide 26 via which the microwave source 16 radiates the microwave radiation 17 in a purposeful and efficient manner into the fuel outlet duct 5. In addition, in the case of the fuel cell stack 25 a temperature sensor 27 is provided for detecting the temperature in the fuel outlet duct 5 with the result that it is possible to perform a particularly efficient control of the microwave source 16, in other words activate and deactivate said microwave source, for generating the microwave radiation 17 in dependence upon the prevailing temperature of the fuel in the fuel outlet duct 5, said temperature being measured using the temperature sensor 27.

As is furthermore illustrated in FIG. 4, the microwave radiation 17 that is radiated by the antenna 21 is reflected a number of times starting from the waveguide 26 in the fuel outlet duct 5 in particular in such a manner that said microwave radiation impinges on water 14 (frozen or liquid) that is present in the fuel outlet duct 5 and warms said water. In this case, frozen water 14 is warmed by means of the microwave radiation 17 at least to the extent that said frozen water melts. Liquid water 14 may also optionally be evaporated by means of the microwave radiation 17 in the case of a corresponding radiation power. The water droplets 14 illustrated in FIG. 4 are to be located in the illustrated case at the fuel outlet bore holes 10 that are already illustrated in FIG. 2.

It is preferred that the microwave source 16 generates a microwave radiation 17 in the Gigahertz range. The required base frequency of the microwave source 16 is determined by means of the specific dimensions and the construction of the fuel cell stack 25 or rather of the fuel outlet duct 5. The base frequency is set by means of the corresponding geometric design of the hollow space resonators of the anode 20 in the magnetron. In the case of an exemplary duct width of approx. 2.5 cm and a wavelength of the microwave radiation of approx. 2 cm, a base frequency of the microwave source 16 is approx. 15 GHz.

Figure 5:
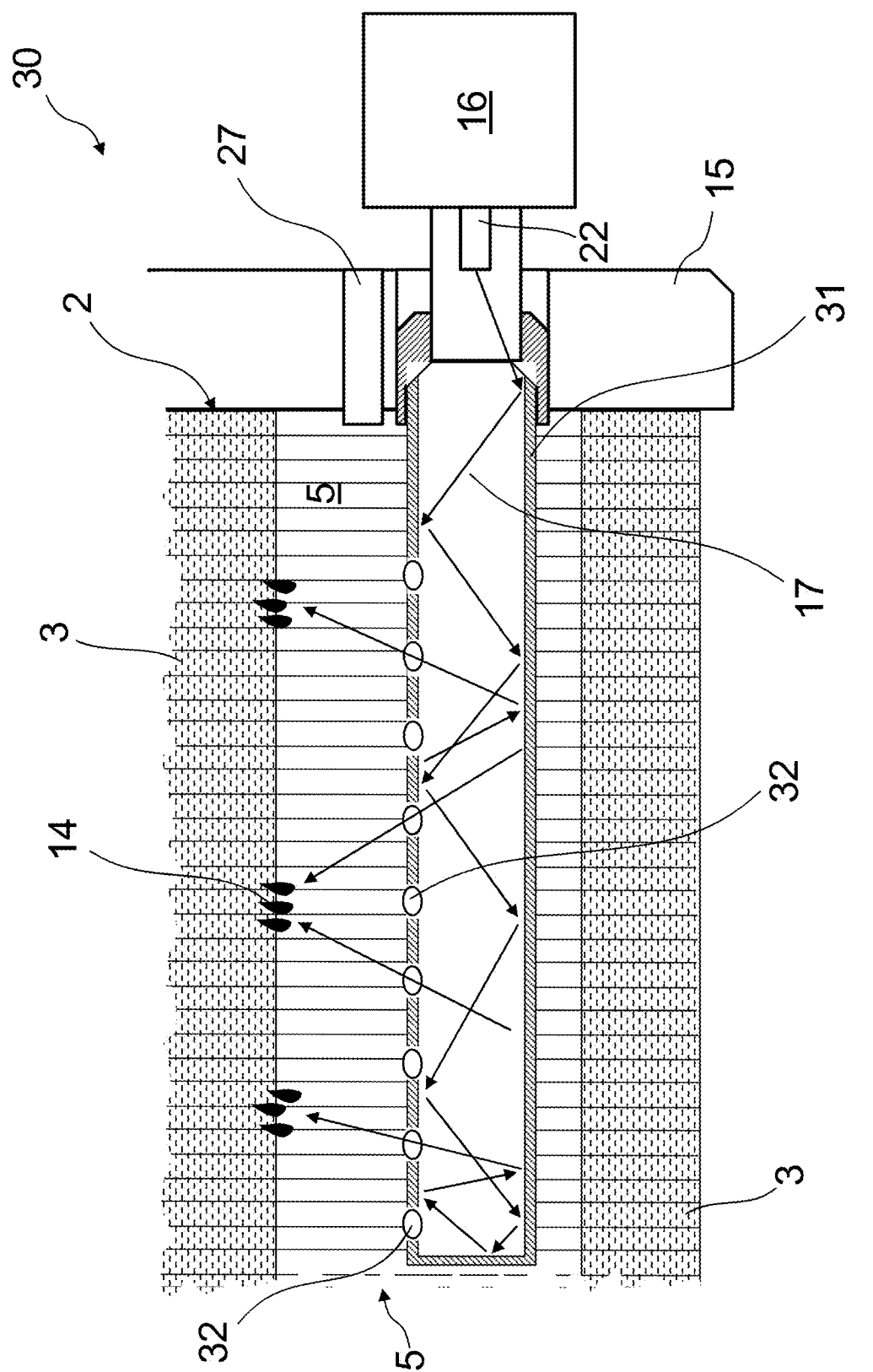
FIG. 5 is a longitudinal sectional view of a further representative embodiment of a fuel cell stack taken along the section plane A-A illustrated FIG. 1.

FIG. 5 illustrates schematically a longitudinal sectional view of a further exemplary embodiment of a fuel cell stack 30 along the section plane A-A illustrated in FIG. 1. The fuel cell stack 30 comprises in contrast to the fuel cell stack 25 shown in FIG. 4 a tubular waveguide 31 that extends into a large part of the longitudinal extension of the fuel outlet duct 5. As is apparent in FIG. 5, the peripheral wall that forms the waveguide tube 31 comprises multiple openings 32. As is apparent in FIG. 5, these openings 32 render it possible for the microwave radiation 17 to be radiated in a site-specific manner into the fuel outlet duct 5 in order in this manner to realize in particular a purposeful, efficient irradiation of the water droplets 14. The openings 32 are arranged for this purpose at predetermined sites along the waveguide tube 31.

Figure 6:
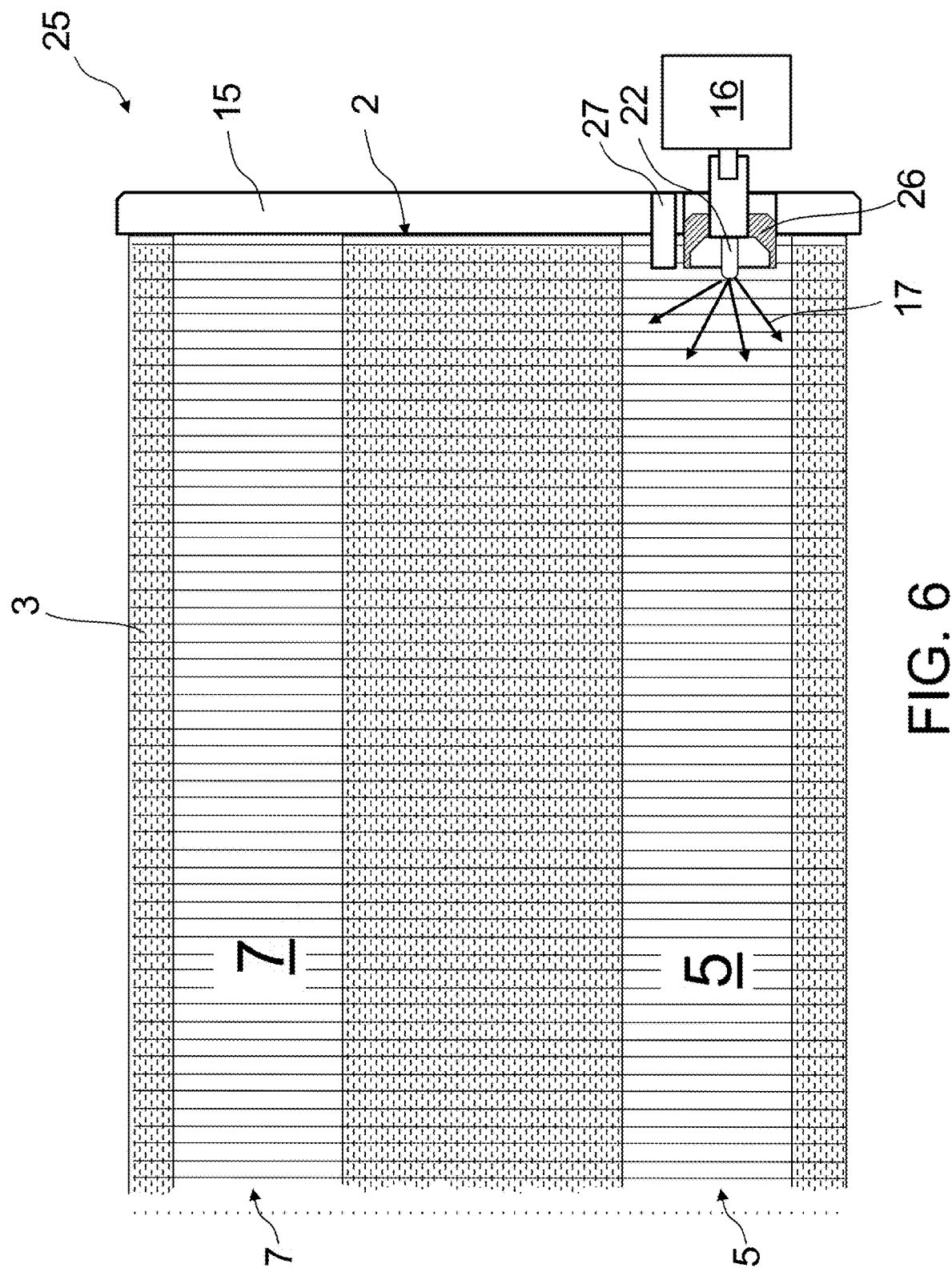
FIG. 6 is a further longitudinal sectional view of the fuel cell stack shown in FIG. 4 along the section plane A-A illustrated FIG. 1.

FIG. 6 illustrates schematically a further, enlarged longitudinal sectional view of the fuel cell stack 25 shown in FIG. 4 along the section plane A-A illustrated in FIG. 1. As is apparent, the fuel cell stack 25 comprises only one microwave source 16 that radiates the microwave radiation 17 only into the fuel outlet duct 5. In this exemplary embodiment of the fuel cell stack 25, a microwave source 16 and a microwave radiation 17 are not provided for the oxidizing agent outlet duct 7.

FIG. 7 illustrates schematically a longitudinal sectional view of a still further exemplary embodiment of a fuel cell stack 35 along the section plane A-A illustrated in FIG. 1. In the case of the fuel cell stack 35, the microwave source 16 is attached and retained in a different manner to that in the case of the previously described fuel cell stacks 1, 25 and 30 on an end plate 36 that closes off the individual cells 3 of the stack 35 at a free stack end 37 which is the other free stack end of the respective fuel cell stack 1, 25, 30 and 35, said other free stack end lying opposite the free stack end 2 (cf. FIGS. 3, 4, 5, 6). FIG. 8 illustrates schematically a plan view of the end plate 36 of the fuel cell stack 35 illustrated in FIG. 7.

As is apparent in FIG. 7, the end plate 36 comprises a water drain bore hole 38 that is allocated to the fuel outlet duct 5 and comprises a water collection vessel 39 that is connected thereto in a fluid-conducting manner. FIG. 7 illustrates that the microwave radiation 17 that is generated by the microwave source 16 is radiated via a curved waveguide 40 and the waveguide 26 into the fuel outlet duct 5 in such a manner that in addition to the water 14 (frozen or liquid) that is present in the fuel outlet duct 5 said microwave radiation likewise arrives at the water drain bore hole 38 and the water collection vessel 39 and as described above uniformly warms any water 14 (frozen or liquid) that is likewise present there. The water drain bore hole 38 and the water collection vessel 39 are used to purposefully discharge or rather remove water 14 that has collected in the fuel outlet duct 5 and are advantageously used for a flushing procedure (also referred to as "purging"), in the present case for a fuel flushing procedure, of the fuel cell stack 35.

As is clearly apparent in FIG. 8, the end plate 36 comprises furthermore a fuel inlet opening 41 that is allocated to the fuel inlet duct 4 (cf. FIG. 1), a fuel outlet opening 42 that is allocated to the fuel outlet duct 5, an oxidizing agent inlet opening 43 that is allocated to the oxidizing agent inlet duct 6 (cf. FIG. 1) and also an oxidizing agent outlet opening 44 that is allocated to the oxidizing agent outlet duct 7. Moreover, a cooling medium inlet opening 45 and a cooling medium outlet opening 46 are also provided in the endplate 36. The respective inlet and outlet openings 41, 43, 45 and 42, 44, 46 are used so as to supply to or discharge from the corresponding inlet and outlet ducts 4, 6, 8 and 5, 7, 9 (cf. FIG. 1) the respective fluids, namely fuel, oxidizing agent and cooling medium. The end plate 36 may also be referred to as an (end-face) flow field plate or a media distribution plate (MDP).

It is possible for the liquid water 14 that has collected in the fuel outlet duct 5 and of which FIG. 7 likewise schematically illustrates a larger quantity of said water adjacent to the water drain bore hole 38 to flow out via the water drain bore hole 38 into the water collection vessel 39. In the case of the exemplary embodiment of the fuel cell stack 35 illustrated in FIG. 7, said liquid water is discharged from said water collection vessel in predetermined time intervals via a corresponding drainage valve arrangement that comprises a drainage line 49 and a drainage valve 48 that may be controlled via a solenoid 47. The irradiation of the water drain bore hole 38 by the microwave radiation 17 effectively prevents frozen water 14 causing a blockage. It is likewise possible for example after a start-up procedure under freezing conditions for frozen water 14 in the water collection vessel 39 to be rapidly thawed and accordingly swiftly discharged.

Figure 9:
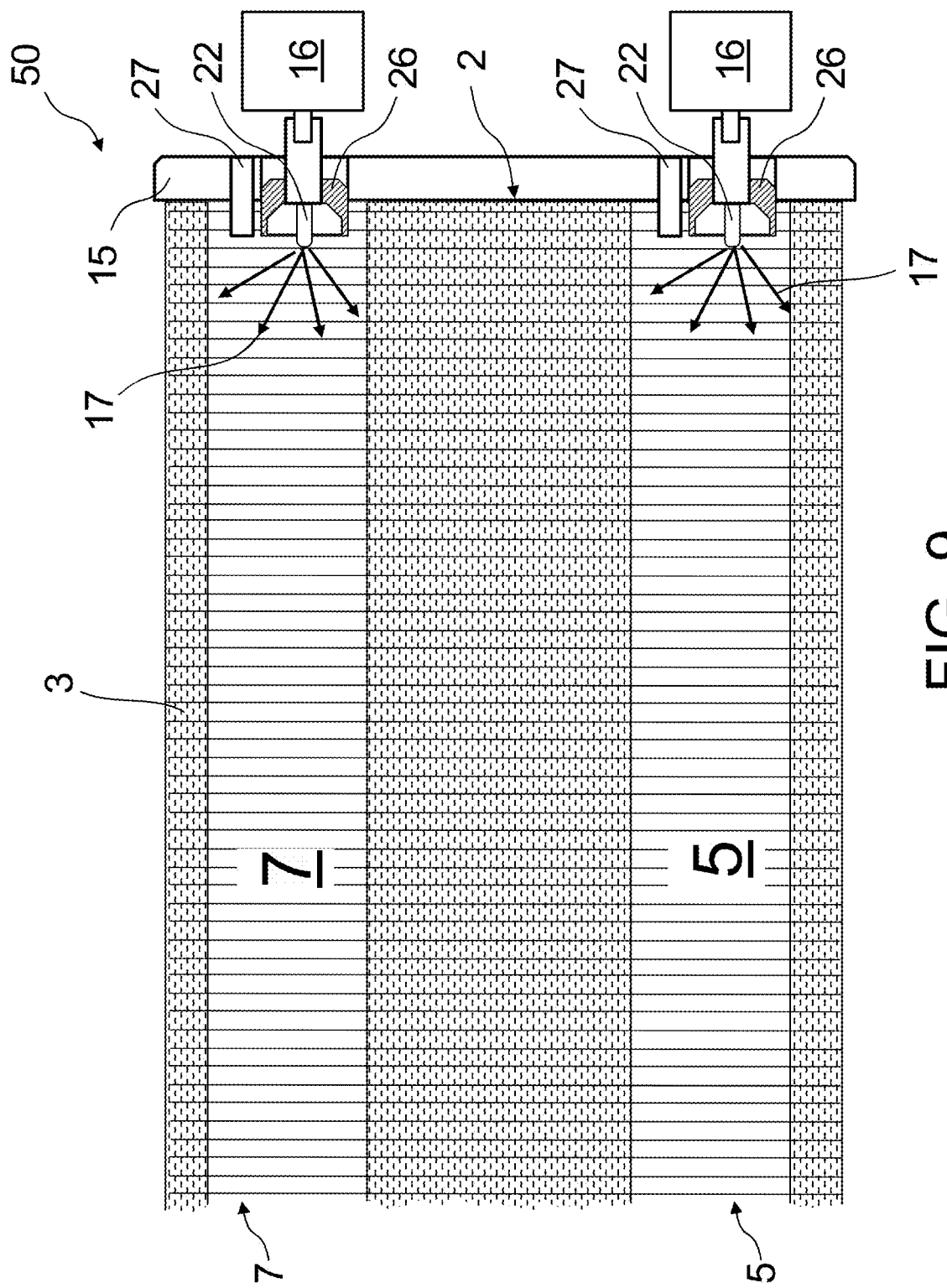
FIG. 9 a longitudinal sectional view of a still further embodiment of a fuel cell stack taken along the section plane A-A illustrated FIG. 1.

FIG. 9 illustrates schematically a longitudinal sectional view of a still further exemplary embodiment of a fuel cell stack 50 along the section plane A-A illustrated in FIG. 1. As is apparent, the fuel cell stack 50 comprises a first microwave source 16 for generating and radiating microwave radiation 17 into the common fuel outlet duct 5, and also a second microwave source 16 for generating and radiation microwave radiation 17 into the common oxidizing agent outlet duct 7.

Figure 10:
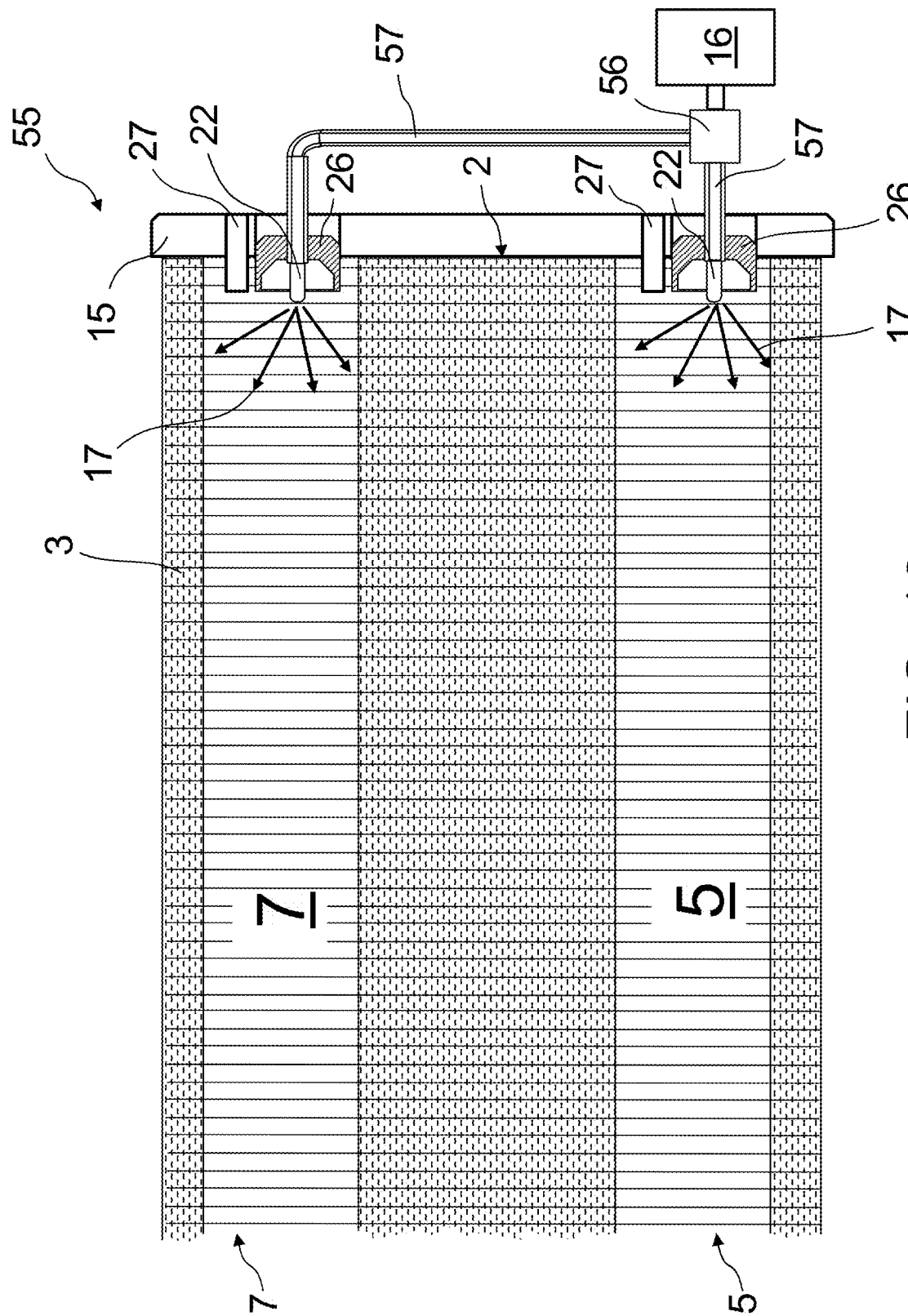
FIG. 10 is longitudinal sectional view of a still further embodiment of a fuel cell stack taken along the section plane A-A illustrated FIG. 1.

FIG. 10 illustrates schematically a longitudinal sectional view of a still further exemplary embodiment of a fuel cell stack 55 in accordance with the invention along the section plane A-A illustrated in FIG. 1. The fuel cell stack 55 comprises a single microwave source 16 for generating and radiating microwave radiation 17, wherein the microwave radiation 17 that is generated by the single microwave source 16 is however in the present case radiated both into the common fuel outlet duct 5 and also into the common oxidizing agent outlet duct 7. For this purpose, the generated microwave radiation 17 is supplied to the respective outlet ducts 5 and 7 via a microwave antenna 57 or rather a branched supply waveguide 57, said microwave antenna branching to a microwave beam splitter 56. In this manner, microwave radiation 17 is supplied to the two outlet ducts 5 and 7 by means of only a single microwave source 16.

Figure 11:
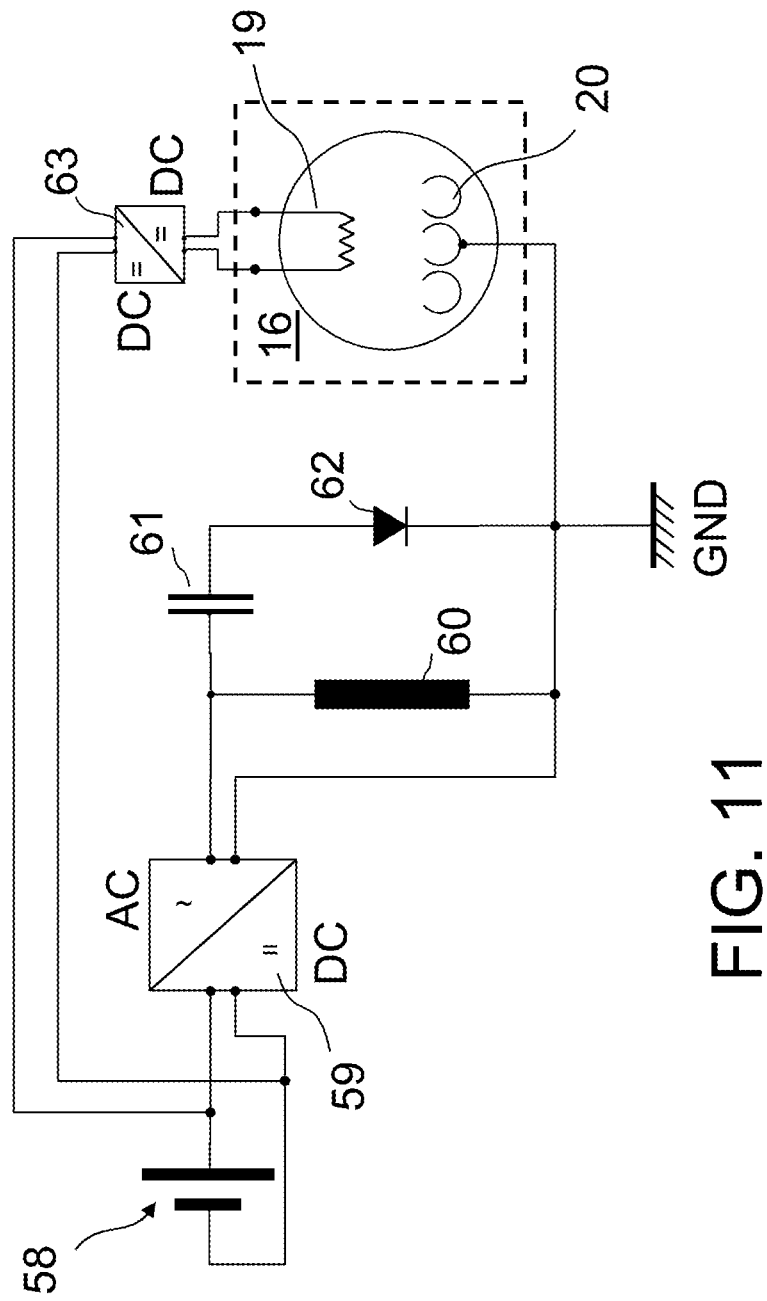
FIG. 11 is a switching arrangement for electrically controlling a microwave source for a fuel cell stack according to various embodiments.

FIG. 11 represents a circuit arrangement for electrically controlling the microwave source 16. As is apparent, in the present case DC voltage (high voltage) is drawn off from a high voltage battery 58, by way of example a traction battery of a motor vehicle (not illustrated) that may be operated by an electric motor, and said DC voltage is converted by a DC/AC converter 59 into an AC alternating voltage that is supplied in turn to a resonance circuit comprising essentially a coil 60, a capacitor 61 and a diode 62, said resonance circuit finally supplying the anode 20 of the microwave source 16. The operating principle of a resonance circuit of this type is generally known and is not further explained here.

On the other hand, the DC high voltage that is drawn off from the high voltage battery 58 is converted via a DC/DC converter 63 into a lower DC voltage and supplied to the cathode or rather to the hot cathode 19.

It is possible with the aid of the circuit illustrated in FIG. 11 for the output power of the microwave radiation 17, which is generated by the microwave source 16, to be continuously controlled by means of controlling the magnitude of the DC voltage (also referred to herein as heating DC voltage) that is supplied to the heating cathode 19 and/or by means of controlling the magnitude and/or the frequency of the anode AC voltage that is supplied to the anode 20. A corresponding electronic control unit (not illustrated) is expediently provided for this purpose.

As an alternative to the continuous control described above of the microwave radiation power, the power of the microwave radiation 17 that is generated by the microwave source 16 may alternatively also be controlled only by switching the microwave source 16 on and off in accordance with a predetermined duty cycle that for an always fixedly predetermined time period specifies a variable duration of the activation procedure and a corresponding variable duration of the deactivation procedure of the microwave source 16.

Figure 12:
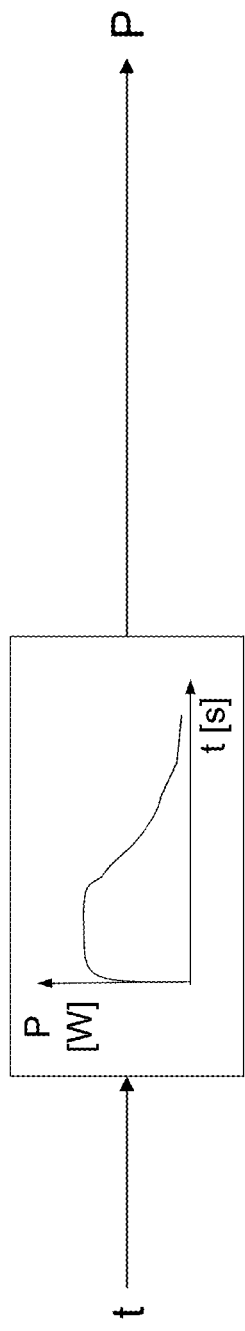
FIG. 12 is a block diagram illustrating a control method of a microwave source for generating a desired microwave radiation for a fuel cell stack according to one or more embodiments.

FIG. 12 illustrates a block diagram for demonstrating a first control method of the microwave source 16 for generating a microwave radiation 17 with a desired radiation power. Said control method in this case is an 'open-loop' control method in which in dependence upon a time t a desired power P of the microwave radiation 17, said desired power being stored by way of example in a look-up table of an electronic control unit, is set with the aid of one of the previously explained two methods for generating the microwave radiation 17 at the microwave source 16.

Figure 13:
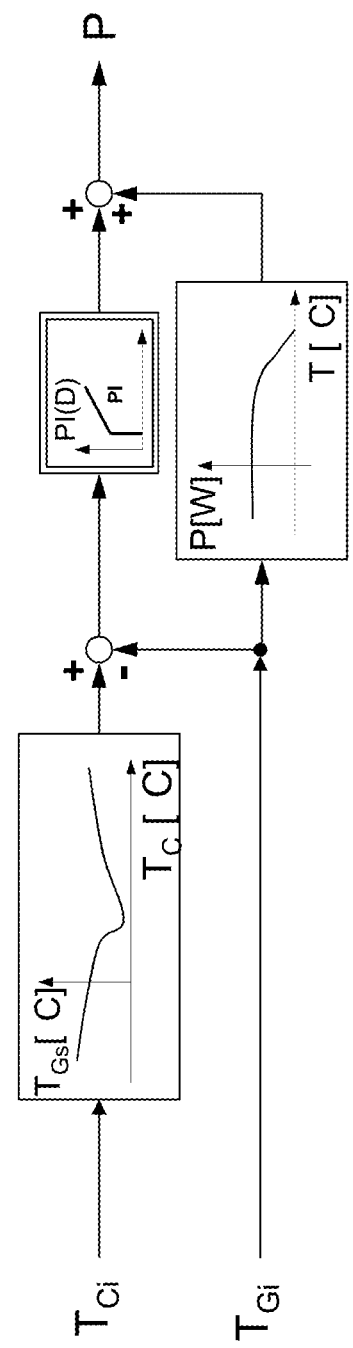
FIG. 13 is a block diagram illustrating a second control method of a microwave source for generating a desired microwave radiation for a fuel cell stack according to one or more embodiments.

FIG. 13 illustrates a block diagram for demonstrating a second control method of the microwave source 16 for generating a desired microwave radiation 17 with a desired radiation power. The illustrated control method is a "closed-loop" control method in which an actual temperature of the fuel in the fuel outlet duct 5 and/or an actual temperature of the oxidizing agent in the oxidizing agent outlet duct 7 is taken into consideration in the control circuit, in other words said actual temperature is fed back into the control circuit, said actual temperature being measured by way of example by means of the temperature sensor 27 (cf. FIGS. 4, 5, 6, 9, 10).

After the microwave source 16 is activated, the actual temperature T of the outlet gas (fuel and/or oxidizing agent) that is determined by means of the temperature sensor 27 is continuously ascertained in the corresponding outlet duct 5 or rather 7. Based on the determined outlet gas actual temperature $T_{Gi}$ in the corresponding outlet duct 5 or rather 7, the power P that is to be set at the microwave source 16 is determined in the present case with the aid of a PI(D) controller (cf. upper branch of the block diagram in FIG. 13). An outlet gas desired temperature $T_{Gs}$ may be determined for example from a cooling medium actual temperature $T_{Ci}$.

The temperature desired window may be in this case additionally kept variable in order to obtain a desired temperature progression over time, in that corresponding temperature power values P(T) are stored in advance by way of example in a look-up table of an electronic control unit and said values are drawn upon for the power control (cf. lower branch of the block diagram in FIG. 13).

The fuel cell stack and also the fuel cell operating method disclosed herein are not limited to the embodiments explicitly described or illustrated herein but rather include also like functioning other embodiments that arise from technically expedient further combinations of the features described herein relating both to the device and also to the method. In particular, the features and feature combinations disclosed above in the general description and the description of the figures and/or the features and feature combinations illustrated merely in the figures may be used not only in the respective combinations disclosed explicitly herein but rather may also be used in other combinations or as stand-alone.

In one embodiment, both the fuel cell stack and also the operating method are used for supplying electrical energy in a motor vehicle, by way of example a one-track or two-track motor vehicle, in particular a motor vehicle that may be operated by an electric motor, for supplying an electric drive motor.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A fuel cell stack, comprising:
a plurality of stacked individual cells;
a fuel inlet duct configured to deliver fuel to anodes of the plurality of stacked individual cells;
a fuel outlet duct configured to collect fuel discharged from the plurality of stacked individual cells;
an oxidizing agent inlet duct configured to deliver an oxidizing agent to the plurality of stacked individual cells;
an oxidizing agent outlet duct configured to collect oxidizing agent discharged from the plurality of stacked individual cells; and
a microwave source configured to selectively generate microwave radiation directed into at least one of the fuel outlet duct and the oxidizing agent outlet duct.

2. The fuel cell stack of claim 1, wherein the fuel outlet duct defines a plurality of fuel outlet bore holes configured to receive fuel discharged from anodes of the plurality of stacked individual cells, the fuel cell stack further comprising a waveguide configured to direct the microwave radiation to the plurality of fuel outlet bore holes.

3. The fuel cell stack of claim 2, wherein the waveguide comprises a tube-shaped waveguide extending at least partially into the fuel outlet duct, wherein a peripheral wall of the waveguide includes at least one opening to direct the microwave radiation to one or more associated fuel outlet bore holes.

4. The fuel cell stack of claim 1, wherein the oxidizing agent outlet duct defines a plurality of oxidizing agent outlet bore holes configured to receive oxidizing agent discharged from cathodes of the plurality of stacked individual cells, the fuel cell stack further comprising a waveguide configured to direct the microwave radiation to the plurality of oxidizing agent outlet bore holes.

5. The fuel cell stack of claim 4, wherein the waveguide comprises a tube-shaped waveguide extending at least partially into the oxidizing agent outlet duct, wherein a peripheral wall of the waveguide includes at least one opening to direct the microwave radiation to one or more associated oxidizing agent outlet bore holes.

6. The fuel cell stack of claim 1, further comprising an end plate positioned on a free stack end and configured to close off the plurality of stacked individual cells, wherein the microwave source is attached to the end plate.

7. The fuel stack of claim 6 further comprising a water collection vessel, wherein the end plate comprises a water drain bore hole fluidly coupling the water collection vessel to the fuel outlet duct, and wherein the microwave source is configured to deliver microwave radiation to the water drain bore hole.

8. The fuel stack of claim 6 further comprising a water collection vessel, wherein the end plate comprises a water drain bore hole fluidly coupling the water collection vessel to the fuel outlet duct, and wherein the microwave source is configured to deliver microwave radiation to an opening of the water collection vessel.

9. The fuel stack of claim 1 wherein the microwave source is configured to generate microwave radiation delivered to the fuel outlet duct, the fuel stack further comprising a second microwave source configured to generate microwave radiation delivered to the oxidizing agent outlet duct.

10. The fuel stack of claim 1 wherein the microwave source comprises a single microwave source configured to generate microwave radiation delivered to both the fuel outlet duct and the oxidizing agent outlet duct.

11. The fuel stack of claim 10 wherein the microwave source comprises a branched microwave antenna.

12. The fuel stack of claim 10 further comprising a branched waveguide configured to deliver the microwave radiation generated by the single microwave source to both the fuel outlet duct and the oxidizing agent outlet duct.

13. A method for operating a fuel cell stack including a plurality of stacked fuel cells, a common fuel inlet duct, a common fuel outlet duct, a common oxidizing agent inlet duct, a common oxidizing agent outlet duct, and a microwave source configured to generate microwave radiation, the method comprising:
   operating the microwave source to deliver microwave radiation to at least one of the common fuel outlet duct and the common oxidizing agent outlet duct in response to temperature being less than five degrees Celsius.

14. The method of claim 13 wherein the microwave source is operated during a start-up procedure of the fuel cell stack.

15. The method of claim 13 wherein the microwave source is operated during a procedure of flushing fuel out of anodes of the fuel cells or during a procedure of flushing oxidizing agent out of cathodes of the fuel cells.

16. The method of claim 13 wherein the microwave source is operated to control moistening of the fuel cell stack.

17. The method of claim 13 wherein operating the microwave source comprises continuously controlling DC voltage supplied to a hot cathode of the microwave source or by controlling an AC voltage magnitude or frequency suppled to an anode of the microwave source.

18. A fuel cell stack, comprising:
   a plurality of stacked individual cells;
   a fuel inlet duct configured to deliver fuel to all of the stacked individual cells;
   a fuel outlet duct configured to collect fuel discharged from all of the stacked individual cells through associated fuel outlet bore holes;
   an oxidizing agent inlet duct configured to deliver an oxidizing agent to all of the stacked individual cells;
   an oxidizing agent outlet duct configured to collect oxidizing agent discharged from all of the stacked individual cells;
   an end plate disposed on one end of the stacked individual cells;
   a microwave source attached to the end plate and configured to selectively generate microwave radiation directed into at least one of the fuel outlet duct and the oxidizing agent outlet duct;
   a water collection vessel fluidly coupled to the fuel outlet duct through the end plate;
   a waveguide configured to direct microwave radiation from the microwave source to the fuel outlet bore holes and an inlet of the water collection vessel; and
   a feedback controller configured to control the microwave source to selectively generate the microwave radiation in response to a measured temperature.

19. The fuel cell stack of claim 18 wherein the waveguide is further configured to direct microwave radiation to the oxidizing agent outlet duct.

20. The fuel cell stack of claim 19 wherein the microwave source comprises a magnetron.

* * * * *